United States Patent [19]

Suzuki

[11] Patent Number: 4,846,439
[45] Date of Patent: Jul. 11, 1989

[54] ELECTROMAGNETIC VALVE ASSEMBLY

[75] Inventor: Shigemitsu Suzuki, Takahama, Japan

[73] Assignee: Aisin Seiki Kabushiki Kaisha, Japan

[21] Appl. No.: 171,361

[22] Filed: Mar. 21, 1988

[30] Foreign Application Priority Data

Mar. 21, 1987 [JP] Japan .................................. 62-067422

[51] Int. Cl.$^4$ .............................................. F16K 31/06
[52] U.S. Cl. ............................ 251/129.14; 251/129.21
[58] Field of Search ....................... 251/129.21, 129.14

[56] References Cited

U.S. PATENT DOCUMENTS 3,307,129  2/1967  Mangiafico ................. 251/129.21 X
3,861,644  1/1975  Knape ........................ 251/129.21 X

FOREIGN PATENT DOCUMENTS 2134067  1/1973  Fed. Rep. of
                 Germany ......................... 251/129.14

Primary Examiner—Arnold Rosenthal
Attorney, Agent, or Firm—Sughrue, Mion, Zinn,
Macpeak & Seas

[57] ABSTRACT

An electromagnetic valve assembly comprises a movable valve member, a valve seat, an electromagnet for attracting the movable valve member toward the valve seat, and a non-magnetic intermediate member interposed between the movable valve member and the valve seat. The non-magnetic intermediate member magnetically isolates the movable valve member from the valve seat so that the movable valve member is free from the residual magnetism of the valve seat to prevetn valve sticking.

2 Claims, 1 Drawing Sheet

ELECTROMAGNETIC VALVE ASSEMBLY

FIELD OF THE INVENTION

This invention relates to an electromagnetic valve assembly, and more particularly, relates to a normally closed type electromagnetic valve assembly which has a movable member driven by a fluid pressure.

BACKGROUND OF THE INVENTION

As shown in FIG. 4, a conventional electromagnetic valve assembly 20 has a bobbin 23, a fixed core 21 including an input port 21a, a valve seat 21b, a magnetic movable valve member 27 including a cone part 27a, a bobbin 23, a non-magnetic sleeve 26, a cylindrical casing 22, a yoke 25, a plate 28 including an output port 28a and an electromagnetic coil 24. The non-magnetic sleeve 26 defines a fluid passage. The bobbin 23 is made of synthetic resin. The magnetic movable valve member 27 is movable into and out of engagement with the valve seat 21b disposed in the fluid passage. The fixed core 21 establishes a magnetic circuit with the casing 22 and the yoke 25. An electromagnetic coil 24 is wound around the bobbin 23 and generates the electromagnetic force in the magnetic circuit.

Accordingly, the movable valve member 27 is attracted to the fixed core 21 and makes a contact with the valve seat 21b. Consequently, the flow of fluid is cut off between the input port 21a of the fixed core 21 and the output port 28a of the plate 28. When the electromagnetic coil is de-energized, the movable valve member 27 is separated from the valve seat 21b by the fluid pressure applied to the input port 21a. Consequently, fluid flows between the input port 21a of the fixed core 21 and the output port 28a of the plate 28. A groove 27b is formed on the outer surface of the movable valve member 27 in order to connect both ends of the movable valve member 27 with each other.

However, in the conventional valve assembly, the valve seat 21b is formed on the fixed core 21 and the magnetic movable valve member 27 makes contact with the valve seat 21b directly. Therefore, even when the electromagnetic coil is de-energized, the cone part 27a of the movable valve member 27 will still be attracted continuously to the valve seat 21b of the fixed core 21 by the residual magnetism. The effect related to residual magnetism is further analyzed hereinafter.

The valve seat 21b and the cone part 27a are disposed coaxially with each other. However, it is very hard to arrange the cone part 27a coaxially to the valve seat 21b perfectly because of manufacturing errors in the dimensions. Accordingly, the cone part 27a tightly contacts the valve seat 21b at some part thereof, but is separated from the valve seat 21b at some other part thereof. Thus, the movable valve member 27 is attracted to the fixed core 21 by the residual magnetism at the contacted part between the movable valve member 27 and the fixed core 21, but is not attracted as strong at the separated part. Furthermore, the fluid supplied to the input port 21a does not flow through the contacted part but flows through the separated part.

As a result the fluid flows between the separated parts of the movable valve member 27 and the fixed core 21 where the attracting force due to residual magnetism is weakened. For example, the fluid flows along the path designated by arrow F in FIG. 3. Therefore, the cone part 27a is affected by the flowing fluid, and one part of the cone part 27a is forced against the valve seat by the attracting force of the residual magnetism as shown by arrow P. Further, the other part of the cone part 27a is forced away from the seat by the separating force shown by arrow Q. Thus the valve member 27 is subjected to a rotating force T. For example, as shown in FIG. 3, the valve member 27 is subjected to a clockwise rotating force T. Accordingly, the axis of the valve member 27 tends to be inclined relative to the axis of the sleeve 26 and become stuck or wedged in the sleeve. As a result the stuck valve member 27 cannot be moved by low fluid pressure and the valve member cannot be opened.

SUMMARY OF THE INVENTION

Accordingly, one of the objects of the present invention is to provide an improved electromagnetic valve assembly which obviates the above conventional drawbacks.

It is also an object of the present invention to provide an improved electromagnetic valve assembly in which the movable valve member is moved smoothly.

To achieve the above objects, in the preferred embodiment of the present invention, a non-magnetic intermediate member is interposed between a movable valve member and a valve seat. The intermediate member magnetically isolates the movable valve member from the valve seat.

Other objects, features and advantages of the present invention will be apparent from the following description of the invention referring to the accompanying figures.

DESCRIPTION OF THE PREFERRED EMBODIMENT

Figure 1:
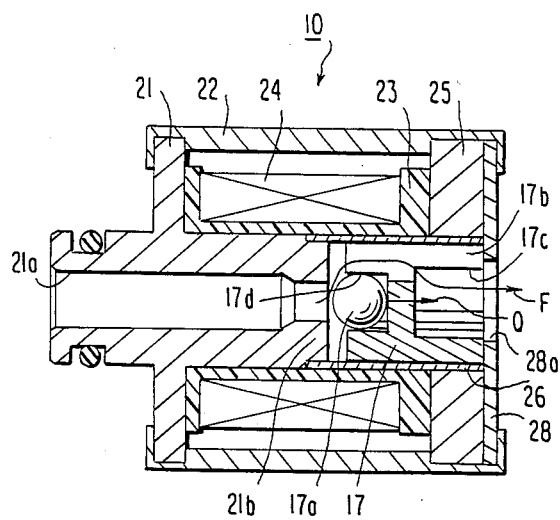
FIG. 1 shows a cross sectional view showing an open state of an electromagnetic valve assembly according to a preferred embodiment of the present invention.
Figure 2:
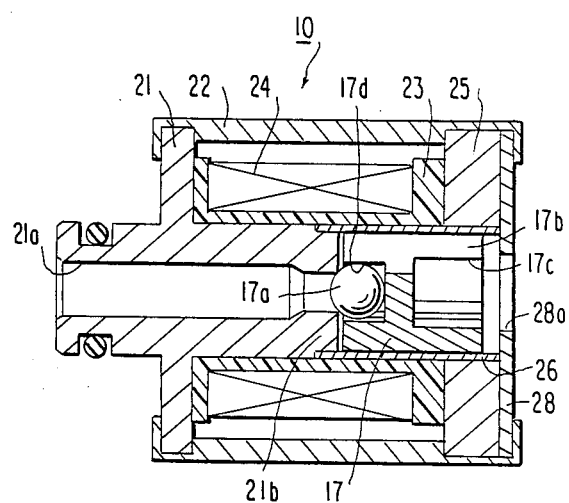
FIG. 2 shows a cross sectional view showing a closed state of the electromagnetic valve assembly according to the preferred embodiment of the present invention.
Figure 3:
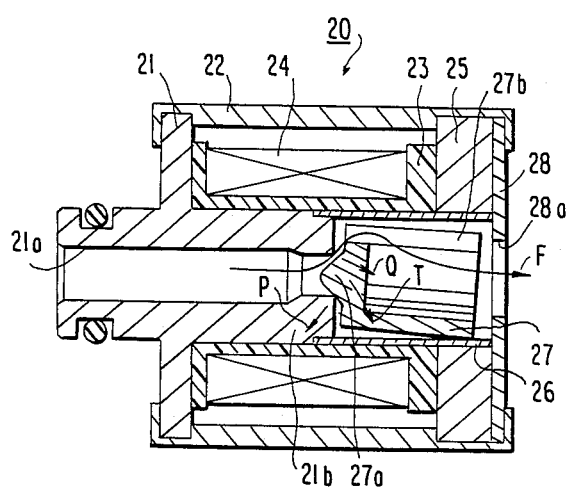
FIG. 3 shows a cross sectional view showing the open state of a conventional electromagnetic valve.
Figure 4:
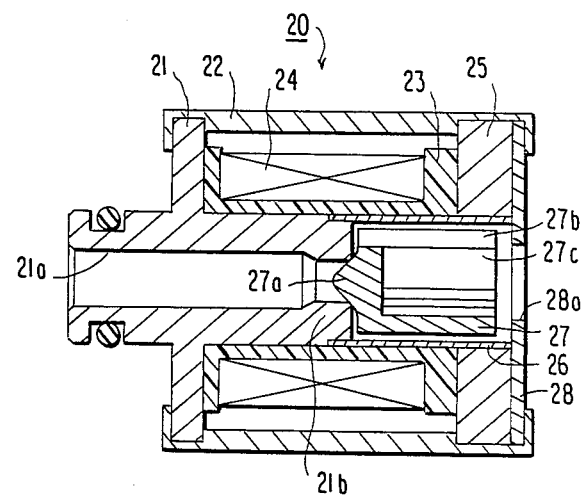
FIG. 4 shows the cross sectional view showing the closed state of a conventional electromagnetic valve.

As shown in FIGS. 1 and 2, an electromagnetic valve assembly 10 has a fixed core 21 and a sleeve 26 fixed to the core 21. The fixed core 21 includes an input port 21a. The sleeve 26 is provided with a flow passage for the fluid. A bobbin 23 made of synthetic resin is disposed around the fixed core 21. A electromagnetic coil 24 is wound around the bobbin 23. A ferromagnetic movable valve member 17 is disposed within the sleeve 26. A plate 28 is disposed on one end of the valve member 17 and is provided with an output port 28a.

A ferromagnetic yoke 25 is interposed between the bobbin 23 and the plate 28 and a cylindrical casing 22 is interposed between the yoke 25 and the fixed core 21. The cylindrical casing 22 is made of a ferromagnetic substance. A magnetic circuit is formed by the plate 28, the yoke 25, the casing 22 and the fixed core 21.

A ball member 17a is inserted into a recess 17d in one end of the movable valve member 17. This ball member 17a tightly contacts the valve seat 21b of the fixed core 21 in the closed state of the valve assembly 10 as shown in FIG. 2. A cylindrical recess 17c in the opposite end of the movable valve member 17 communicates with a plurality of grooves 17b that are formed on the outer surface of the movable member 17. The grooves 17b also communicate with the recess 17d in which the ball 17a is located.

The operation of the electromagnetic valve 10 is as follows. When the electromagnetic coil 24 is energized, the movable valve member 17 is attracted to the valve seat 21b of the fixed core 21. This operation is shown in FIG. 2. The valve seat 21b is sealed by the ball member 17a and the flow of fluid is cut off.

When the electromagnetic coil 24 is de-energized, the ball member 17a is forced by the fluid pressure applied to the input port 21a toward the plate 28 into the position shown in FIG. 1. At this time, the fluid flows along the grooves 17b in the direction of the arrow F.

At the time when the valve member 17b is moved toward the plate 28, the valve member 17b is free from the effect of residual magnetism since the ball member 17a is made of a non-magnetic substance. Accordingly, the fluid pressure is applied directly to the movable valve member 17 and the movable valve member 17 is forced by the coaxial force away from the fixed core 21. Therefore, the movable valve member 17 is moved smoothly along the sleeve 26 in the direction of the arrow Q. Consequently, the valve will not stick in the sleeve 26. The diameter of the valve member 17 in FIGS. 1 and 2 according to the present invention is greater than the diameter of the valve member 27 in the prior art embodiment thereby reducing the gap between the valve member and the sleeve. This is possible since the ball member is better able to compensate for axial misalignment of the valve member 17 relative to the valve seal 21b than the cone on the end of the valve member 27 in the prior art embodiment. As a result, the chances of the valve member getting stuck are reduced.

While the invention has been particularly shown and described with reference to preferred embodiments thereof, it will be understood by those in the art that the foregoing and other changes in form and details may be made therein without department from the spirit and scope of the invention.

What is claimed is:

1. An electromagnetic valve assembly comprising:
    a movable valve member of magnetic material;
    a fixed member of magnetic material defining a valve seat;
    electromagnetic means for attracting said movable valve member toward said seat; and
    a nonmagnetic intermediate ball interposed between said movable valve member and said valve seat for sealingly engaging said valve seat;
    wherein the movable valve member is provided with a recess in one end thereof in which said ball is located in a protruding manner and a plurality of longitudinal grooves disposed in an outer surface of said movable valve member in fluid communication with said recess whereby upon de-energinization of said electromagnet means said ball will be moved away from said valve seat to permit flow of fluid through said valve seat, around said ball and through said grooves.

2. An electromagnetic valve assembly according to claim (1), wherein said electromagnetic means comprises;
    an electromagnetic coil;
    a fixed core magnetically connected to one pole of said electromagnetic coil;
    a yoke magnetically connected to the other pole of said electromagnetic coil; and
    whereby a magnetic circuit is formed including said movable valve member.

* * * * *